No. 708,316. Patented Sept. 2, 1902.
A. CASTELIN.
KNOTTING DEVICE FOR HARVESTING MACHINES.
(Application filed June 24, 1901.)
(No Model.) 4 Sheets—Sheet 1.

Witnesses:
F. R. Ernest
Robert Everett

Inventor
André Castelin,
By James L. Norris.
Atty.

No. 708,316. Patented Sept. 2, 1902.
A. CASTELIN.
KNOTTING DEVICE FOR HARVESTING MACHINES.
(Application filed June 24, 1901.)
(No Model.) 4 Sheets—Sheet 2.
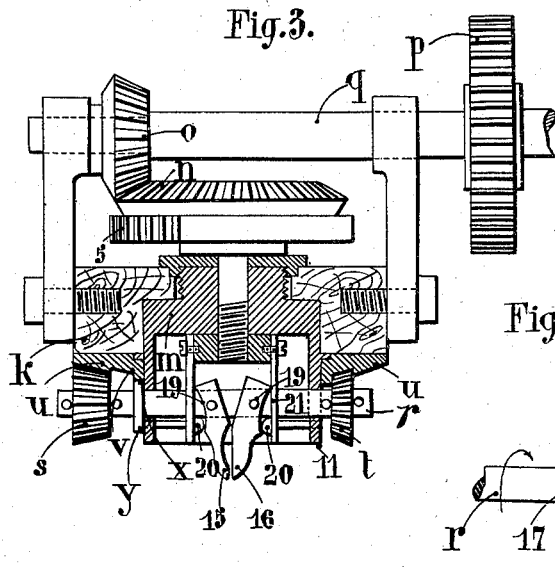
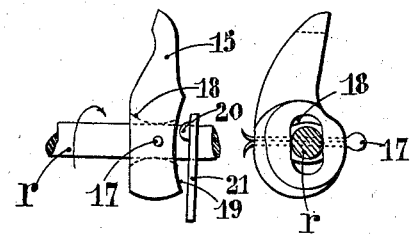
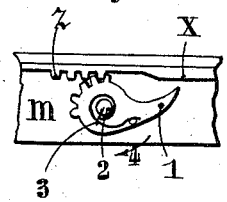

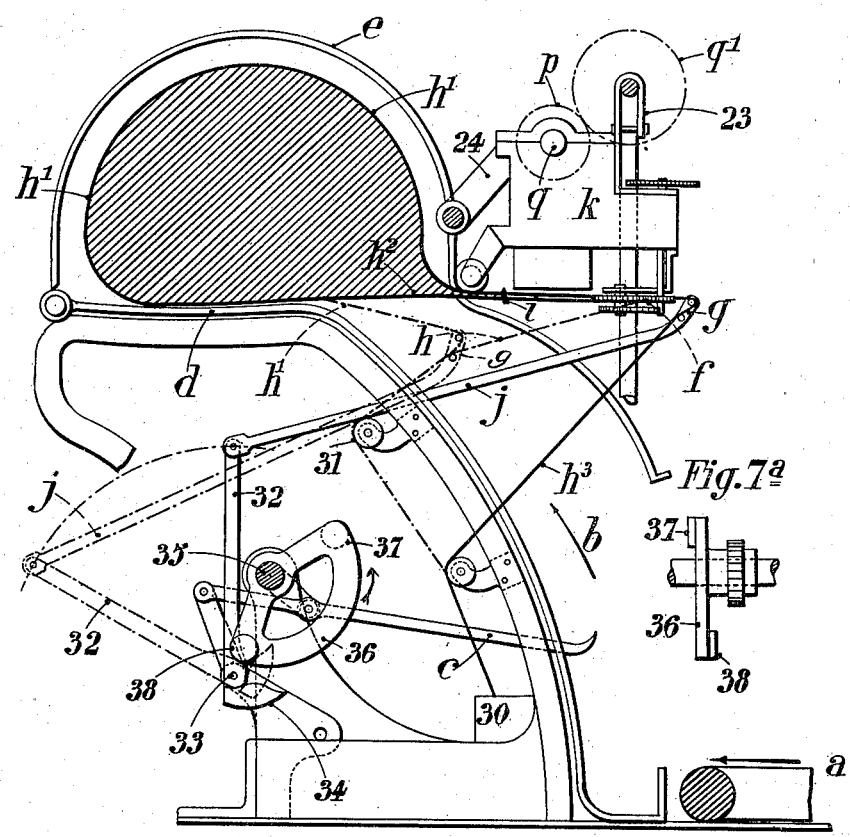

No. 708,316. Patented Sept. 2, 1902.
A. CASTELIN.
KNOTTING DEVICE FOR HARVESTING MACHINES.
(Application filed June 24, 1901.)
(No Model.) 4 Sheets—Sheet 4.

Witnesses.
F. R. Ernest.
Robert Everett.

Inventor.
André Castelin.
By James L. Norris.
Atty.

UNITED STATES PATENT OFFICE.

ANDRÉ CASTELIN, OF PARIS, FRANCE, ASSIGNOR TO SOCIÉTÉ ANONYME D'ETUDES ET D'EXPLOITATION DES BREVETS A. CASTELIN POUR MACHINES AGRICOLES AUTOMOBILES, OF PARIS, FRANCE.

KNOTTING DEVICE FOR HARVESTING-MACHINES.

SPECIFICATION forming part of Letters Patent No. 708,316, dated September 2, 1902.

Application filed June 24, 1901. Serial No. 65,866. (No model.)

*To all whom it may concern:*

Be it known that I, ANDRÉ CASTELIN, engineer, a citizen of the French Republic, residing at Paris, France, (whose post-office address is 10 Rue Caumartin, in the said city of Paris,) have invented certain new and useful Improvements in Knotting Devices for Harvesting-Machines, of which the following is a specification.

This invention relates to the knotters of sheaf binding or harvesting machines in which the binding of the sheaves is effected by means of a needle supplied with cord from a ball or a spool.

The essential features of this invention are the means for feeding and taking up the slack cord by means of two fingers working as human fingers by which the formation of the knots in the binding-cord is effected so as to insure the said knots not coming undone accidentally.

In order that the invention may be clearly understood, I will now proceed to describe it with reference to the accompanying drawings, of which—

Figure 1:
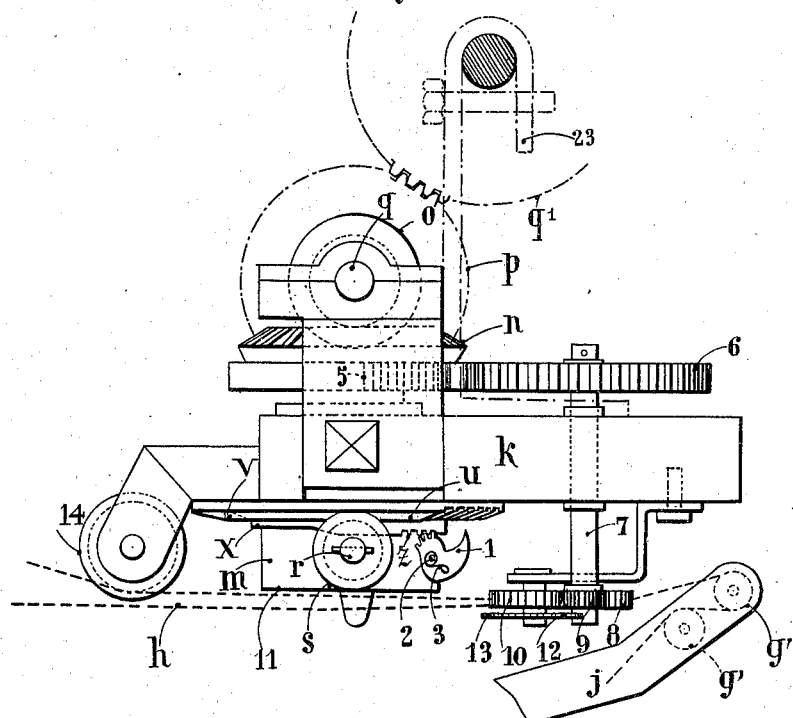
Figure 2:
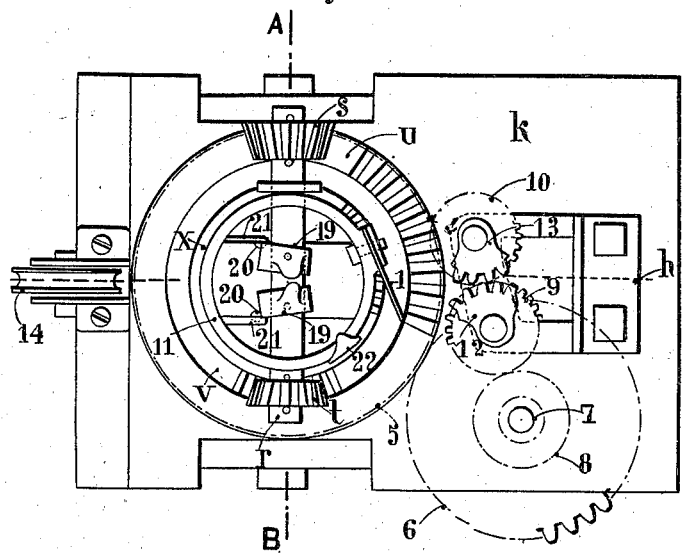

Figure 1 is a side elevation of the apparatus. Fig. 2 is an under side view of the same; Fig. 3, a section on line A B of Fig. 2. Figs. 4 and 5 are detail views of the knot-forming fingers, drawn to a larger scale. Fig. 6 is a detail view of a portion of the knife by which the cord is severed. Fig. 7 shows diagrammatically a portion of a harvesting-machine fitted with the improved knotting device. Fig. 7ª is a detail view of one part of the needle-operating mechanism. Figs. 8 to 14 show the members of the apparatus in the various positions they occupy in the formation of the knot, and Fig. 15 shows the shape of the knot obtained by the improved apparatus.

Before proceeding to describe the means for forming the knots the means for feeding the cord will be described with reference to Fig. 7 of the drawings, in which is shown the position of the knotter on the harvesting-machine, though these means do not constitute a part of this invention. In this figure, $a$ is the endless apron, by which the cut crop (which I will hereinafter refer to as "corn") to be bound in sheaves is carried to the lower end of a path or channel $b$, where it is seized by arms $c$ and raised thereby to the upper end of the said channel onto a table $d$, on which it accumulates between the said table and a rod $e$ until sufficient is collected to form a sheaf. At $f$—say a point which I hereinafter will term the "cord-holder" of the knotting device—a cord $h$ is fixed, which cord passes over and between two rollers $g$ $g$ (shown by full lines in Fig. 7) when shifted into position to tie a bundle and from there to a bobbin or ball contained in a box 30. It is easy to understand that the corn as it is raised in the channel $b$ by the fingers $c$ takes with it this cord, which will be gradually drawn around the sheaf in course of formation, and the cord will take the form $h'$. The rollers $g$ $g$ are fixed at the extremity of a needle $j$, the upper end of which bears on a grooved pulley 31, while it is attached by its lower end to a vibrating lever 32, oscillating on the point 33. This lever or arm is provided at its lower end with a projection or tappet 34, placed, say, on the right side of the lever, while the needle is attached on the left side. On a shaft 35 and in the vertical plane of the vibrating arm 32 is a sector 36, which rotates loosely on the said shaft and to which intermittent rotations can be imparted in the direction of the arrow by a suitable gearing, which has not been shown on the figure for sake of clearness and because it forms no part of my present invention. The sector 36 is provided on its opposite sides with projections 37 and 38, respectively, Fig. 7ª. When the sector is operated, the projection 38 thereof will act on the tappet 34 when the latter is in the position shown by dotted lines. When the action of the projection is completed, the vibrating arm 32 will occupy the position shown by full lines in said Fig. 7, at which point the sector is stopped for a predetermined time. On the next operation of the sector the projection 37 acts on the vibrating arm 32 and causes the same to swing back and retract the needle $j$ to the position shown by dotted lines, which brings the tappet 34 into position to be again operated by the projection 38. During the oscillation the needle always bears on and is guided by the grooved pulley 31, so that when the motion is completed the rollers $g$ $g$, carried by the upper end of the said needle, are brought into a convenient position with regard to the cord-holder $f$. When the sheaf has attained the proper size, the needle $j$ is pushed forward, as just explained, and the cord, which occupies the position $h'$, will assume the shape $h'$ $h^2$ $h^3$, the parts $h'$ $h^2$ of which encircle the sheaf, while the part $h^3$ is that leading from the rollers $g$ to the cord-supply or bobbin in the box 30. The cord being in this position, a knot is tied at $i$, and the cord is cut at the right of this knot. The sheaf will be tied and becomes independent of the machine, from which it may be removed by any convenient means. The needle being in the position shown in full lines, if a further rotation be given to the sector 36 the projection 37 of the said sector will strike against the needle and return it in the backward position shown in dotted lines, and as one end of the cord is always held fast by the holder at $f$ it is understood that when the needle has come back a strand of cord $h$ will be stretched between $f$ and $g$ for the next operation, this strand being in accordance with the present invention a continuation of that used for tying the previous sheaf.

The binder proper comprises a main body or platform $k$, of wood, cast-iron, or other suitable material, in which revolves an inverted cup $m$, rotation being imparted to the said cup by means of bevel-wheels $n$ $o$, driven by the spur-wheel $p$, keyed on a shaft $q$. This spur-wheel $p$ is in gear with a spur-wheel $q'$, Fig. 1, on a shaft in connection with the driving parts of the machine, which impart to it a rotary motion at regular intervals of time. The cup $m$ carries a spindle $r$, having fitted at its opposite ends bevel-wheels $s$ and $t$ of unequal size. These bevel-wheels gear with and travel on stationary crown-wheels $u$ and $v$, provided each with teeth on arcs of suitable length and position. Integral with these crown-wheels is a cam-shaped path $x$, which acts on a collar $y$ on the shaft $r$, Figs. 1 and 3. The path $x$ is provided with a certain number of teeth $z$—four, for instance—which are intended to gear with the teeth of a knife $l$, the purpose of which is to sever the cord at the required periods. This knife, as shown in detail in Fig. 6, is mounted on a stud 2 on the exterior of the cup $m$, with which it rotates. It can turn on the stud 2 and is provided with a spring 3, which when the teeth of the knife are not gearing with the teeth $z$ of the cam-path $x$ tends to rotate it in the direction of arrow 4, Fig. 6.

Attached to or formed integral with the bevel-wheel $n$ is a toothed sector 5, Fig. 1, gearing with a toothed wheel 6, situated above the upper face of the table or main body $k$. This toothed wheel 6 at each revolution of the sector 5 has imparted to it a partial rotation, which it transmits through the medium of its spindle 7 to a train of wheels 8 9 10, arranged beneath the main body $k$ in a plane nearly level with the lower edge 11 of the cup $m$.

Keyed on the arbors of the wheels 9 and 10 below the said wheels are toothed segments 12 13, the length of the teeth of which segments is somewhat greater than that of the said wheels 9 and 10. These toothed segments are intended to receive between their teeth the cord $h$, which is fed by the needle $j$. As shown in Figs. 1 and 2, this cord passes under a roller 14, situated in front of the knot, and thence around the rollers $g'$ on the needle $j$. When this needle reaches the end of its stroke—that is to say, the position shown in full lines in Fig. 7—the rollers $g'$ are a little above the level of the segments 12 and 13, so that the cord is stretched above the said segments. At this moment the sector 5 imparts movement of partial rotation to the wheel 6 and through it to the train of wheels 8 9 10. The cord will then be held fast first between the teeth of the segments 12 and 13 and then between the teeth of the wheels 9 and 10, the two ends of the cord being thus held fast in position during the knotting operation.

To the part of the spindle $r$ which is inside the cup $m$ are pivoted two fingers 15 and 16, one of which, 15, is shown in detail in Figs. 4 and 5. These two fingers are pivoted at 17 to the spindle $r$, so as to move in the plane of the said spindle, and to admit of such movement the walls 18 of the holes on the fingers through which the spindle $r$ passes are curved, as shown in Fig. 4. The external faces 19 of these fingers are likewise curved and bear against projections 20 on plates 21, arranged inside the cup $m$. These projections 20 remaining stationary and the spindle $r$ being caused to rotate in one direction or the other while the said projections are in contact with the faces 19 of the fingers 15 and 16, the said fingers will be caused to incline to the right or to the left, according to the direction of rotation of the spindle $r$. The points of these fingers will thus be brought nearer to or farther apart from each other, as required. On the rim 11 of the cup $m$ is a snug 22, the purpose of which will be hereinafter described.

The apparatus thus constructed may be fixed on the harvesting-machine by any convenient means—for example, as shown in Figs. 1 and 7, by bars 28 and 24.

Figure 8:
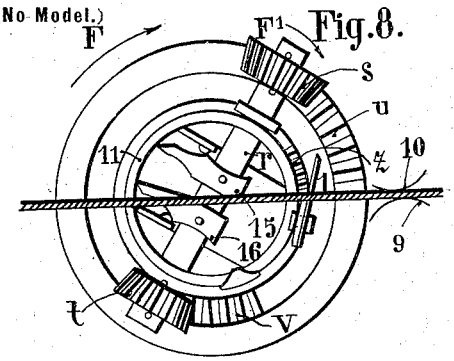
Figure 9:
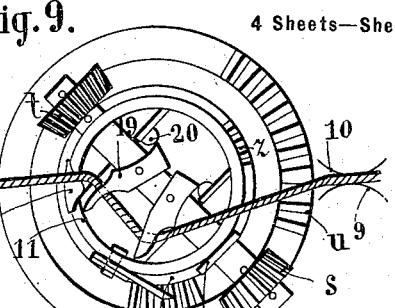
Figure 10:
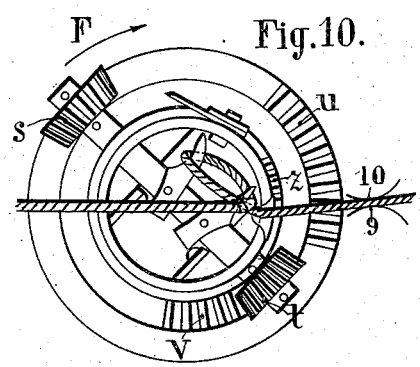
Figure 11:
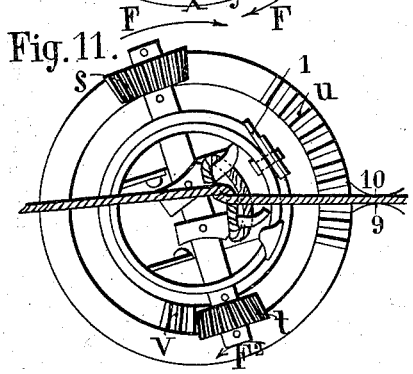
Figure 12:
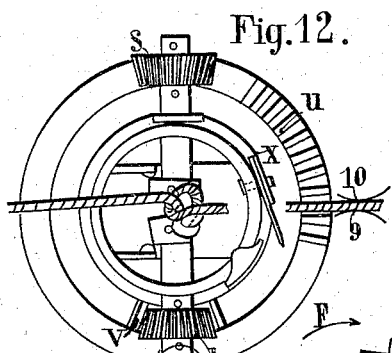
Figure 13:
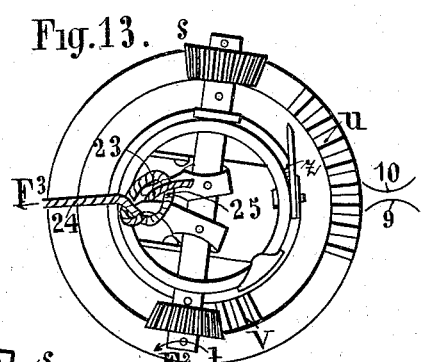
Figure 14:
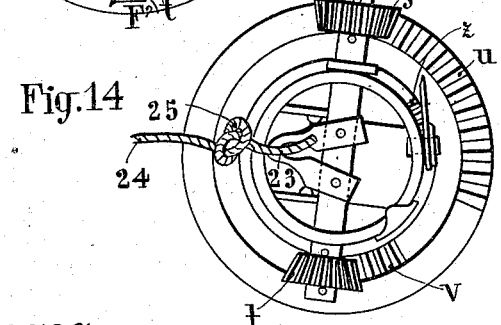
Figure 15:

The working of the apparatus will be understood from the following description with reference to Figs. 8 to 14, in which one cord only is employed in order to simplify the description. It is obvious that in practice the apparatus will act on the two parts of a cord, as shown in Fig. 1. In the normal position of the apparatus, as shown in Fig. 8, the cord is pinched between the toothed wheels 9 and 10 and stretched over the rim 11 of cup $m$, the fingers 15 and 16 being in a horizontal position inside the cup and nearly at right angles to the spindle $r$. The wheel $s$ is about to gear with the crown-teeth $u$, the wheel $t$ having just left the crown-teeth $v$, and the knife $l$ is in its backward position. If the cup $m$ is caused to revolve in the direction of the arrow F, Fig. 8, it will carry with it the spindle $r$ and cause the wheel $s$ to engage with the crown-teeth $u$, and this will cause the said spindle $r$ to rotate in the direction of the arrow F'. When the cup $m$, with the spindle $r$, comes to the position shown in Fig. 9, the fingers 15 and 16 are by the rotation of the spindle $r$ caused to bear on the cord and the wheel $s$ has left the crown-teeth $u$ and the rotation of the spindle is stopped and the fingers remain pressed down by the cam $y$, which is now running on the path $x$. The ends of the fingers are now above the rim 11 and are drawn apart from each other by the projections pressing on the faces 19 of the said fingers, and the snug 22 has become engaged with the cord, so as to prevent it from slipping on the rim of the cup $m$, and as the cord is pinched between the gear-wheels 9 and 10 it is held taut while the parts are in the position shown in Fig. 9. As the cup $m$ moves into the position shown in Fig. 10 the spindle $r$ is caused to occupy a position at an angle of one hundred and eighty degrees to that shown in Fig. 9. Neither the bevel-wheel $s$ nor the bevel-wheel $t$ has come into gear with the crown-teeth $u$ and $v$. Neither the distance apart of the points of the fingers nor their position on the spindle $r$ has altered. However, the rotation of the cup $m$ has caused the snug 22 to release the cord. Fig. 10 shows the formation of the loop, and Fig. 11 shows the said loop having received a twist to form the knot. The fingers 15 and 16 are still horizontal; but the bevel-wheel $t$ is about to gear with the toothed crown $v$, which will cause the spindle $r$ to rotate in the direction $F^2$ and will raise the fingers. At the same instant the teeth on the knife $l$ engage with the teeth $z$ on the path $x$, thereby causing the knife to be raised. In the position of the parts shown in Fig. 12 the bevel-wheel $t$ is still engaged with the crown-teeth $v$; but the fingers are raised to a vertical position and their extremities brought nearer each other by the engagement of the projections 20 with the surfaces 19 of the fingers, and the cord is gripped between the wheels 9 and 10. During the passage of the cup $m$ from the position shown in Fig. 11 to that shown in Fig. 12 the knife $l$, whose teeth are engaged with the teeth $z$, has been raised and inclined forward, so as to sever the cord between gear-wheels 9 and 10 and the fingers 15 and 16, and as the severance takes place while the said cord is taut the severance takes place under the best conditions. When the cup $m$ is in the position shown in Fig. 13, the teeth of the knife $l$ have left the teeth $z$ and the knife has been brought to its backward position by the spring 3 in readiness for the next operation. The bevel-wheel $t$ has in this movement of the cup $m$ rolled over the whole of the crown-teeth $v$, and the spindle $r$ has continued revolving in the direction of the arrow $F^2$ and lowered the fingers 15 and 16 to the left of the spindle $r$. The severed end 23 of the cord being still in engagement with the said fingers, if a pull is exerted in the other end 24 in the direction of the arrow $F^3$ the loop 25 will slip from the fingers, as shown in Fig. 14, which represents the knot closed and completed, the end 23, where the severance took place, being released from the fingers 15 and 16. The apparatus being fixed to the harvesting-machine, as shown in Fig. 7, the pull on the cord is exerted by the compression of the sheaf by the said cord. The end of the cord remains always engaged between the gear-wheels 9 and 10, so that if the needle $j$ moves from right to left, Fig. 7, as soon as the knot has been formed there will be again a cord stretched between the points $f$ and $g$, which cord will be used in tying the next sheaf. When the sheaf is of the required size and the needle has been moved from left to right, the toothed segment 5 drives the wheel 6, and consequently the gear-wheels 9 and 10 and wheels 11 12, so that the new length of cord fed by the needle engages with the teeth of the gear-wheels 9 and 10. This movement will take place while the spindle passes from the position shown in Fig. 13 to that shown in Fig. 8, which was taken as the normal position of the parts. This movement will take place at each revolution of the cup $m$—that is to say, twice during the formation of the knot—the first time when the needle is on the left and the cord surrounds the sheaf and the second time as soon as the needle is moved to the right. The first movement has for its object to free the cord from engagement with the teeth of wheels 9 and 10. The second movement holds fast the end of the cord fed by the needle.

Fig. 15 shows the knot formed by the two ends of the cords that tie the sheaf, this latter being formed by the loop 26.

The operation of this apparatus is certain in action, and among other advantages it utilizes a cord unwound from a bobbin or a ball to produce knots that will not come undone.

Having now particularly described and ascertained the nature of my said invention and in what manner the same is to be performed, I declare that what I claim is—

1. In a binding apparatus, the combination of a rotary cup, a shaft supported by said cup, a plurality of fingers carried by said shaft for independent oscillation, means for rotating the cup and shaft respectively and means for effecting a movement of each of the fingers, independent of those applied to the cup and shaft.

2. In a binding apparatus, the combination of a cup, a shaft supported by said cup, means for rotating the cup, driven devices carried by said shaft, means for independently actuating said driven devices, a plurality of fingers shiftably carried by said shaft, and means for effecting motion of the fingers independent of those applied to the shaft and cup respectively.

3. In a binding apparatus, the combination of a cup, a shaft supported by said cup, means for rotating the cup, driven devices carried by said shaft, means for independently actuating said driven devices, a plurality of fingers shiftably carried by said shaft, and fixed projections arranged in the paths of said fingers and serving to shift the same.

4. In a binding apparatus, the combination of a rotary cup, a shaft supported by said cup, a plurality of fingers carried by said shaft for independent oscillation, means for rotating the cup and shaft respectively, means for effecting a movement of each of the fingers, independent of those applied to the cup and shaft, and means upon the cup for holding the cord for a predetermined period.

5. In a binding apparatus, a cup, a shaft carried by the cup, means for rotating said cup, gears carried by said shaft, fixed racks for engaging said gears as the cup is rotated, for rotating said shaft, a plurality of fingers shiftably carried by said shaft, and means for effecting motion of the fingers independent of those applied to the cup and shaft, respectively.

6. In a binding apparatus for harvesters, a cup, a knife mounted upon said cup, a toothed sector connected with the knife, teeth mounted independently of the sector for engaging the same to put the knife in its working position means normally acting upon the knife in opposition to said teeth, and means for rotating said cup.

7. In a binding apparatus for harvesters, a cup, means for rotating the same, a shaft carried by said cup, independent devices for effecting the rotation of said shaft during a certain period of the rotation of said cup, means for preventing rotation of said shaft during the remainder of the rotation of the cup, a plurality of fingers carried by said shaft, and means for effecting the motion of said fingers independent of those applied to the cup and shaft, respectively.

8. In a binding apparatus for harvesters, a shaft, a plurality of fingers having holes to receive said shaft, the walls of the holes being inwardly curved and said fingers having external incurved faces, pivots passing through the fingers and shafts respectively, and fixed projections for engaging said external incurved faces.

In testimony whereof I have hereunto set my hand in presence of two subscribing witnesses.

ANDRÉ CASTELIN.

Witnesses:
EDWARD P. MACLEAN,
EMILE KLOP.